Oct. 24, 1967 H. S. DISHART 3,348,513
LIFE-SAVING SAFETY DEVICES FOR TWIN PASSENGER AIRCRAFT OR SHIPS
Filed April 20, 1966 3 Sheets-Sheet 1
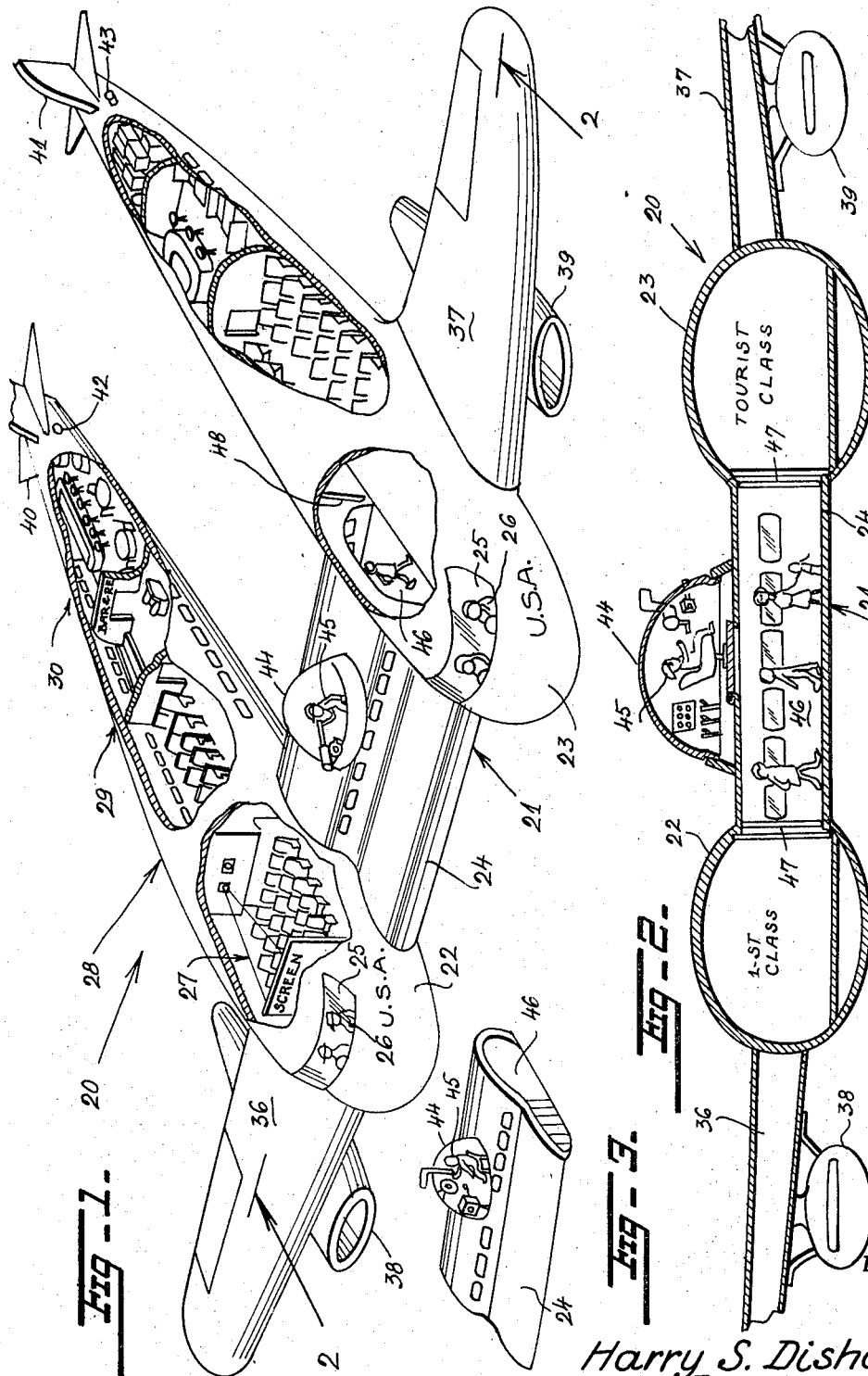
INVENTOR
Harry S. Dishart
BY Polachek & Saulsbury
ATTORNEYS Oct. 24, 1967  H. S. DISHART  3,348,513
LIFE-SAVING SAFETY DEVICES FOR TWIN PASSENGER AIRCRAFT OR SHIPS
Filed April 20, 1966  3 Sheets-Sheet 2
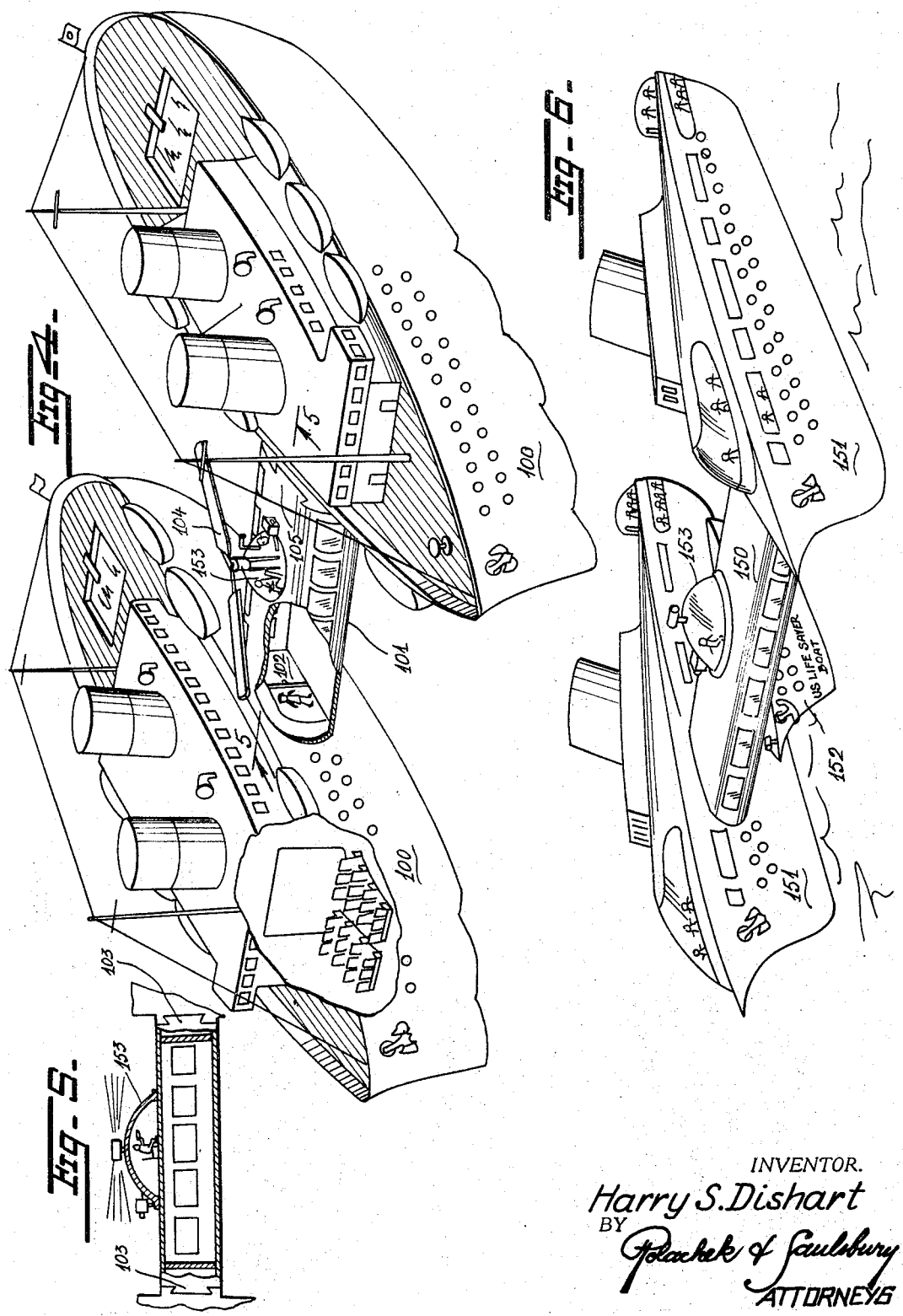
INVENTOR.
Harry S. Dishart
BY Polachek & Saulsbury
ATTORNEYS

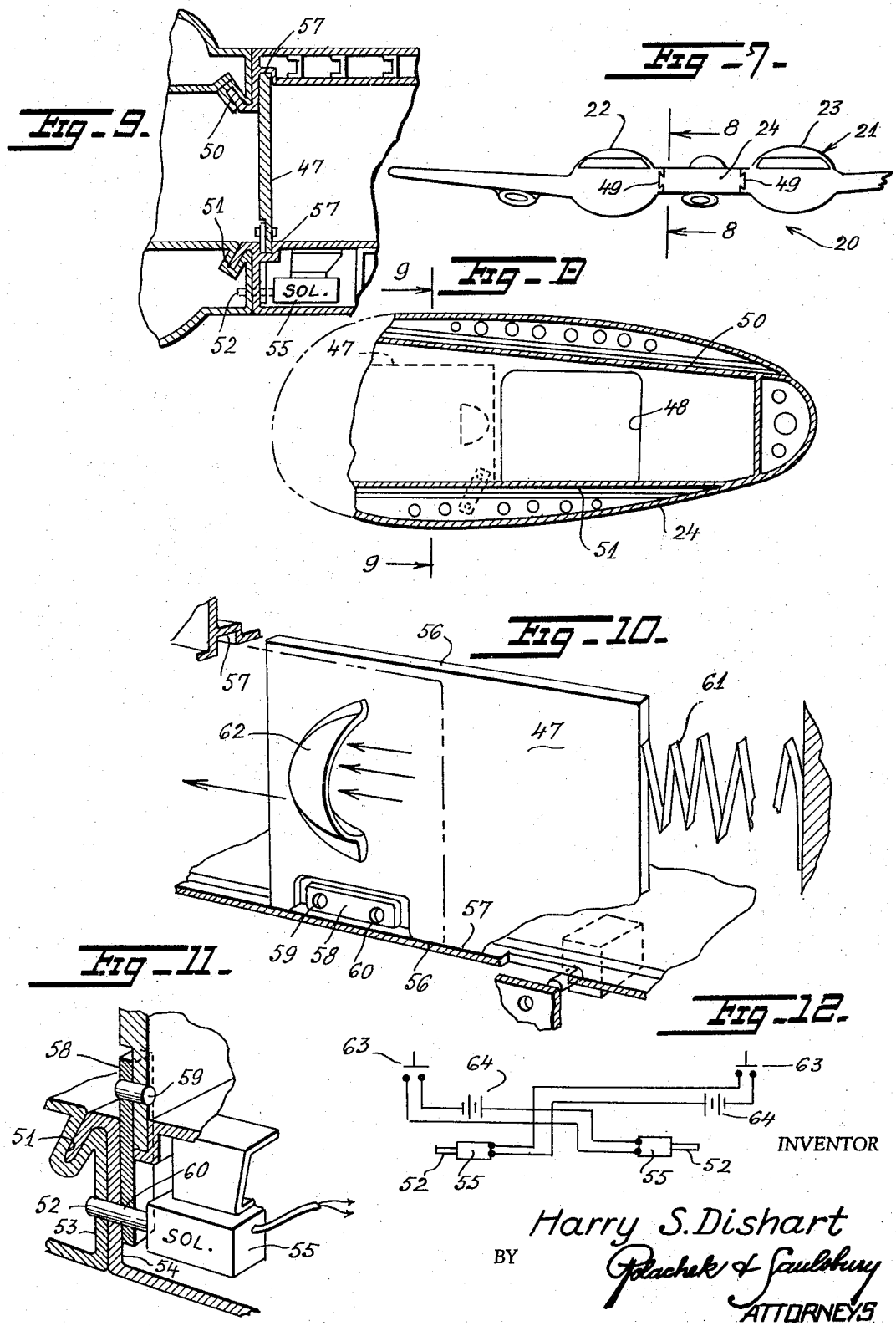

United States Patent Office 3,348,513
Patented Oct. 24, 1967

3,348,513
LIFE-SAVING SAFETY DEVICES FOR TWIN
PASSENGER AIRCRAFT OR SHIPS
Harry S. Dishart, 5701 Ft. Hamilton Parkway,
Brooklyn, N.Y. 11219
Filed Apr. 20, 1966, Ser. No. 543,941
7 Claims. (Cl. 114—.5)

ABSTRACT OF THE DISCLOSURE

Life-saving safety devices for twin passenger aircraft or ships comprising a plurality of hull components in parallel spaced apart relation, a connecting bridge between the hull components, dovetail and groove means for separating the bridge from either of the hull components, a passageway for permitting movement of persons from one hull component to the other, a slidable door for sealing the passageway.

This invention relates generally to life-saving safety devices for twin passenger aircraft or ships. More specifically it relates to hull design for aircraft or ships.

A principal object of the present invention is to provide a novel hull design for aircraft or ships which has self-contained means for separating into components, certain of which may survive in case certain of the other components are in danger of destruction while in travel, thereby preventing destruction of the entire craft or ship and loss of all life.

Another object is to provide a novel hull design having self-contained means to permit all persons aboard the destruction-bound craft or ship to evacuate the distressed components and enter the components of safety, if time permits, thus saving all life.

Another object is to provide a novel hull design for ships or aircraft comprised of a pair of tandem hull components in parallel, spaced apart relation which are connected together by a separable structure through which persons may freely move from one to the other.

Another object is to provide a novel hull design which permits the saving of at least some of the lives aboard in case of unforewarned disaster to one of the hull components. It is well known that in many aircraft accidents today, that no surviver remains to tell what happened and thus corrective measures for such accidents are more difficult to ascertain.

A further object is to provide a novel hull design wherein each hull component has its own power plant and its own control pilot.

A still further object is to provide a novel hull design wherein the interconnecting structure between the hull components would have a lookout pilot in communication with the other pilots.

A still further object is to provide a hull design having pilot controlled means for separating the hull components if preferred and automatic means for sealing the communicating passageway entrance which has been left open due to separation from the other hull component.

Yet a further object is to provide a novel hull design wherein the components will automatically separate in cases where one part of an airplane strikes a mountain or another airplane on flight, thus permitting persons on the remaining part of the airplane to survive.

Other objects are to provide a novel hull design which is streamlined, rugged in construction and efficient in operation.

These and other objects will be readily evident upon a study of the following specifications and the accompanying drawings herein:

FIGURE 1 is a perspective view of an aircraft incorporating the invention shown partly broken away to illustrate the interior construction.

FIG. 2 is a cross-sectional view taken on line 2—2 of FIG. 1.

FIG. 3 is a fragmentary perspective view of a modified look-out station.

FIG. 4 is a perspective view partly in cross-section showing the invention applied to a sea-going ship.

FIG. 5 is a cross-sectional view taken on line 5—5 of FIG. 4.

FIG. 6 is a perspective view showing the invention incorporated in a modified design of a ship.

FIG. 7 is a front elevational view of an airplane incorporating the present invention.

FIG. 8 is an enlarged cross-sectional view taken on line 8—8 of FIG. 7.

FIG. 9 is an enlarged cross-sectional view taken on line 9—9 of FIG. 8.

FIG. 10 is a perspective view of a sliding door that forms a part of the present invention.

FIG. 11 is a cross-sectional perspective view of structure shown in FIG. 9, and

FIG. 12 is an electrical wiring diagram.

Referring now to the drawings in detail, and more particularly to FIGS. 1–3 and 7–12, the reference numeral 20 represents an aircraft having a hull 21 comprised of a pair of tandem hull components 22 and 23 spaced apart by a communicating bridge 24.

As shown in FIGS. 1 and 2, the hull component 22 is for first class passengers, offering "red carpet" service and includes a cockpit 25 for pilots 26, a theater 27, first class seat area 28, lounge 29, and bar and restaurant 30.

The hull component 23 includes cockpit 31 for pilots 32, tourist class seating area 33, coffee shop 34 for tourist class passengers and a baggage compartment 35.

The aircraft further includes wings 36 and 37, engines 38 and 39, tails 40 and 41 and gas tanks 42 and 43.

The bridge 24 is of wing-shaped configuration to offer lift to the craft and includes an observation dome 44 for a lookout pilot 45. A passageway 46 extends through the bridge to permit persons to walk from one to the other hull component. At each end of the passageway a slidable door 47 in a doorway 48 is normally kept open but may be automatically closed in time of disaster.

Each end of the bridge is connected to the hull component by a dovetail 49 (shown most clearly in FIG. 7) which allows the parts to be slidable relative to each other. FIG. 8 shows that the upper and lower groove 50 and 51 respectively of the dovetail are not parallel but extend convergingly rearwardly, thereby permitting each hull component to slide rearwardly only off of the end of the bridge. Thus, should one of the wings or its hull component strike a mountain or other airplane, it will, due to impact, slide off of the bridge end while the remainder of the airplane continues to fly ahead.

To prevent ready or accidental disengagement due to vibrations or other normal forces, a slide bolt 52 extends through a wall 53 on the hull component and an adjacent wall 54 on the bridge to lock the parts together. The slide bolt is slidably movable by a solenoid 55 controlled from the cockpit.

The door 47 has parallel upper and lower edges 56 that are slidable in parallel grooves 57 formed on the bridge. A link 58 supported pivotally free on a pin 59 secured on the door, has an opening 60 to receive the slide bolt 52 therethrough also. Thus, the slide bolt at the same time, prevents the door to be closed except when the hull component and bridge are unbolted. A spring 61 normally urges the door to move into closed position when the slide bolt is withdrawn. When the hull component and bridge are already separated the wind on the exposed door will bear against baffle 62 projecting into the airstream and further and in closing the door to prevent any person within the bridge passageway from being drawn outward into the airstream.

In operative use, in case of unexpected collision with a mountain or other craft during flight, the force of impact will shear the slide bolt and the part of the craft that has impacted to slide rearwardly separating from the remainder of the plane which will continue to fly. Thus, at least, some of the lives aboard may be saved, these comprising persons not in the stricken part of the craft.

When disaster is foreseen, persons may be evacuated from one hull component to the other and the pilot then, by controls, activates the solenoid, thus causing the slide bolt to unlock and allow the hull component and bridge to slide apart. At the same time, the door closes automatically.

As shown in FIG. 12, an electric switch 63 is located in each cockpit which is connected to a battery 64 and to the solenoid at the bridge's farthest end from the particular pilot. The craft thus separated, permits the bridge to serve as an airfoil or wiring to balance the remaining wing on the other side of the hull component.

In a modified application of the invention for sea going ships, as shown in FIGS. 4 and 5, the structure includes separate ship hulls 100 and connecting bridge 101. Sliding doors 102 and dovetails 103, generally similar in structure as above described, are also included. The construction however may additionally include a helicopter motor and propeller 104 on the bridge together with dovetails 105 in a vertical plane to permit separation upwardly of the bridge from the ship hulls should the bridge be desired to be used as a helicopter (see FIG. 4).

In an alternate construction shown in FIG. 6, the bridge 150 between hulls 151 is shown to incorporate its own hull 152 therebelow. The bridge may be separated from the hulls 151 as above described, and in the present modification incorporating its own hull serve as a rescue boat or the like.

It will be noted that observation domes 153 serve like purposes as on the airplane above described.

While various changes may be made in the detail construction, it is understood that such changes will be within the spirit and scope of the present invention as defined by the appended claims.

What is claimed is:

1. In a hull design, the combination of a plurality of hull components in parallel spaced apart relation, a connecting bridge between said hull components, means for selectively separating said bridge from either of said hull components, said bridge including a passageway therethrough to permit movement of persons from one said hull component to the other and a slidable door at each end of said passageway for sealing the end of said passageway when an adjacent hull component has been separated from said bridge, said means for selectively separating said bridge from each of said hull components comprises a dovetail having a pair of spaced apart grooves, said grooves extending convergingly toward one end to permit separation in one direction only.

2. The combination as set forth in claim 1, wherein said bridge and each of said hull components has a vertical wall adjacent to each other, a slide bolt extending through said walls, a solenoid connected to said slide bolt for selectively engaging or disengaging said wall relative to one another, each of said solenoids being electrically connected to a source of power and a manually controlled switch within each cockpit on each of said hull components.

3. The combination as set forth in claim 2, wherein each said sliding door has a link secured pivotally free by its one end thereto, and the other end of said link having an opening for receiving said slide bolt therethrough for securing said door in open position when said bridge and hull components are locked together.

4. The combination as set forth in claim 3, wherein a compression spring normally urges each of said sliding doors toward a closed position.

5. The combination as set forth in claim 4, wherein each of said sliding doors has a baffle on its outer side to abut with the airflow when said outer side of door is exposed to the air stream due to separation of said bridge from one of said hull components.

6. The combination as set forth in claim 5, wherein said bridge includes a helicopter motor and propeller, and each of said dovetails is in a vertical plane to permit upward separation of said bridge from each of said hull components.

7. The combination as set forth in claim 5 wherein said bridge includes a hull on its underside to permit travel in the water.

References Cited

UNITED STATES PATENTS

| | | | |
|---|---|---|---|
| 1,774,414 | 8/1930 | Bleriot | 244—2 |
| 2,359,549 | 10/1944 | Epstein | 114—77 X |
| 2,998,208 | 8/1961 | Di Perna | 244—2 |
| 3,161,373 | 12/1964 | Vogt | 244—2 |
| 3,227,399 | 1/1966 | Dastoli et al. | 244—2 |

MILTON BUCHLER, *Primary Examiner.*

T. M. BLIX, *Assistant Examiner.*